July 4, 1933.  H. L. MASON  1,916,767
VALVE
Filed Dec. 6, 1928
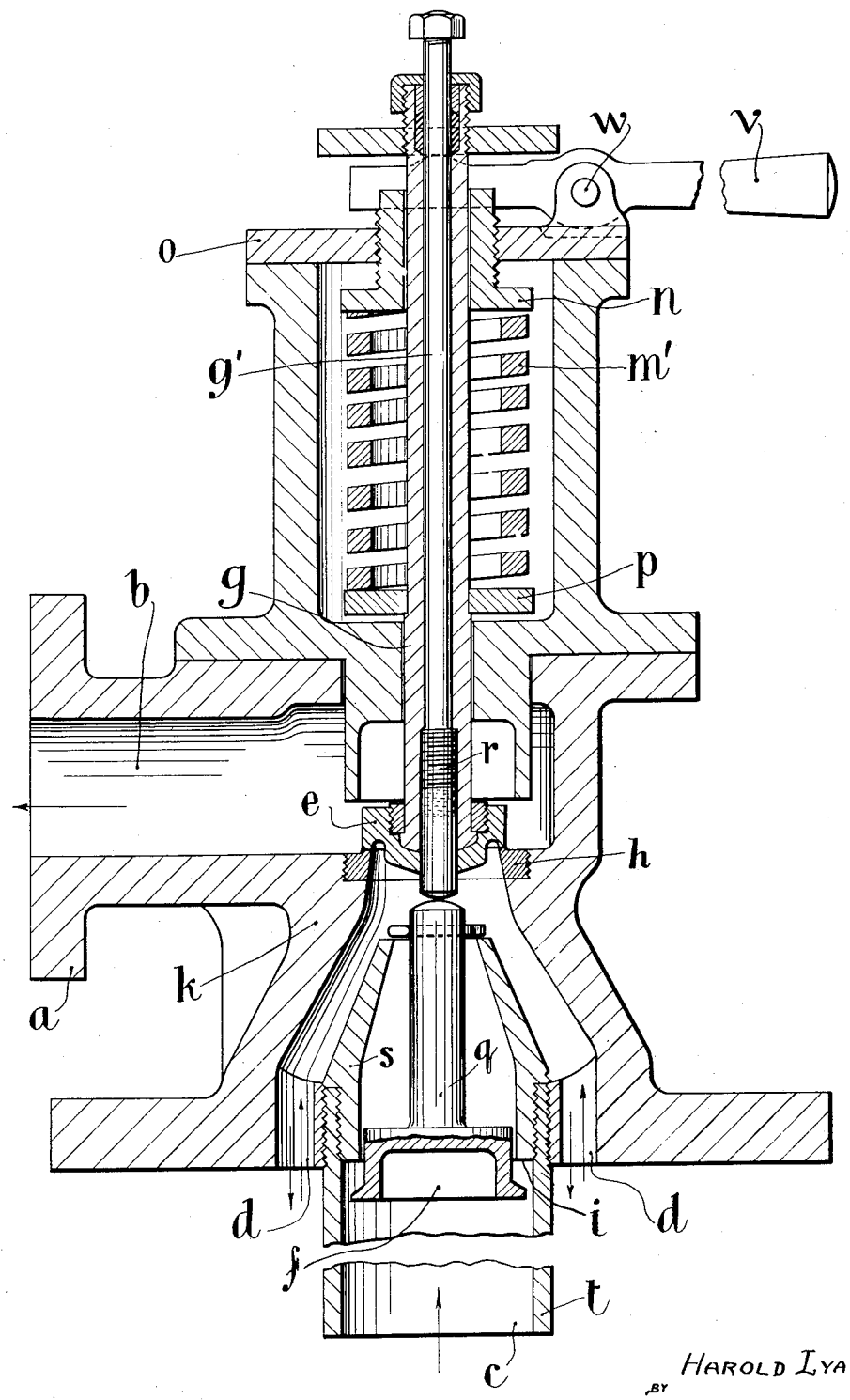
Inventor
HAROLD LYALL MASON,
BY
Toulmin & Toulmin
Attorneys Patented July 4, 1933

1,916,767

UNITED STATES PATENT OFFICE

HAROLD LYALL MASON, OF HAMPSTEAD, LONDON, ENGLAND

VALVE

Application filed December 6, 1928, Serial No. 324,142, and in Great Britain December 13, 1927.

This invention relates to valves of the type known as safety, relief, reducing, regulating and similar valves, particularly to automatically operated fluid pressure valves.

The object of the present invention is to provide a valve of simple and compact structure which shall be sensitive to slight variations in pressure.

Another object is to provide an improved form of high lift valve.

Auxiliary valves are known of a type in which the lifting action of the fluid, after the valve is initially opened, is aided or reinforced by a floating actuator disc or a piston which, in some cases, is on the high pressure side and in other cases on the low pressure side of the valve.

In accordance with this invention I provide an automatically operated fluid valve which comprises a main valve and a supplementary actuator valve on the fluid side of the main valve both controlled by a common loading device, means being provided whereby the lift of the actuator valve can be varied and adjusted independently of the lift of the main valve, or the load operating against the actuator valve can be varied and adjusted independently of the load operating against the main valve.

The accompanying drawing illustrates the invention.

The figure is a sectional elevation of an ordinary safety valve made in accordance with this invention.

In the figure the body of the whole valve $a$ has a plurality of openings, one $b$ above, functioning as an exhaust, one $c$ below for admission of fluid, and openings $d$ between the main valve $e$ and the actuator-valve $f$, for admission and discharge of fluid. Spindle $g$ connected to and supporting valve $e$ has an internal spindle $g'$ which is adjustably screw-threaded to spindle $g$ at $r$ thus allowing the relative lifts of the main valve $e$ and the actuator valve $f$ to be altered. The fluid in passing through the openings $d$ may be at the same pressure or a different pressure from that passing through or acting on the actuator valve $f$. The main valve $e$ and the actuator valve $f$ are so arranged that when one is closed the other is open and vice versa, so that the fluid under pressure entering by openings $c$, $d$, which at one time operates against the upper or main valve will, when it overcomes the resistance of the spring on the spindle $g$ operate to open the main valve $e$, and to close and hold closed the actuator valve $f$. This actuator valve $f$ in return will be opened when the pressure of the load exceeds the pressure under the said actuator valve $f$. Main valve member $e$, and actuator valve $f$ are provided with seatings $h$, $i$. Main valve $e$ is shown on its seating and the actuator valve $f$ shown off its seating; but even when off its seating the actuator valve $f$ extends within its seating to a slight extent as illustrated.

In order to provide a sensitive loading device so as to permit of the opening of the valve sufficiently to give a good area compared with its diameter, a spiral or helical loading spring $m'$ is disposed about valve spindle $g$. Spring $m'$ abuts at one end on a shouldered element $n$ screwed into the top $o$ of the valve casing, and at the other end upon a disk $p$ secured to the valve spindle $g$.

The valve spindle is divided into two parts $g$, $q$ thereby providing an independent spindle for actuator valve $f$, so that the main valve $e$ is not impeded from rising when the predetermined pressure is reached should any impediment such as grit or scale for example, hinder actuator valve $f$ from rising. A lever $v$ pivoted at $w$ to the top $o$ is provided to raise the main valve $e$ from off its seat if desired.

Tube $t$ is a prolongation of the steam entrance $c$ designed to ensure that the steam in space $c$ shall not be affected by the pressure drop inevitable with the steam under motion passing up the passages $d$, and is therefore of a length suitable for this purpose.

There are a plurality of suitably formed holes $d$.

The operation of the form of valve illustrated is as follows:—

Assuming the valve to be on a boiler containing steam under pressure, under these circumstances the steam will be free to pass through the openings $d$ from the boiler, and from another part of the boiler through the opening $c$, passing the actuator valve $f$ and exerting a pressure against the main valve $e$, which is held in place by the spring $m'$, which may be set to permit the valve to rise when the set pressure is exceeded.

The actuator valve $f$ in the position shown in the drawing is in a state of equilibrium, pressure being equal on both sides of it.

Should the pressure rise above the predetermined amount the main valve $e$ will be raised from its seat and steam will commence to escape through the opening $b$. This would, under normal circumstances, cause a pressure drop in the chamber immediately below the main valve $e$, a drop in pressure which will extend through the opening $d$ into the portion of the boiler about this opening, the pressure drop being due to its conversion into velocity, in the escaping steam. This velocity will not affect the opening $c$, which is removed from it and the actuator valve $f$ will become unbalanced due to there being a greater pressure in the portion $c$ below the actuator valve $f$ than above it. A conical nozzle $s$ is provided above the seating $h$ to utilize the velocity of the fluid about to pass through the main valve to increase the pressure difference operating the actuator.

A very considerable additional pressure drop is obtained by the action of the velocity of the steam escaping through the openings $d$ passing over the nozzle of the cone $s$, and the effect is to reduce the pressure above the actuator valve $f$ practically to that of the atmosphere.

Under these circumstances, the actuator valve $f$, which is of greater diameter than the main valve $e$, will move sharply upwards and seat in spite of the increase of resistance due to the compression of the spring $m$; in this position the lower side will be exposed to the full boiler pressure and the upper as stated to a pressure approximating that of the atmosphere.

The main valve $e$ on the other hand will be carried up by the actuator valve so far that the escaping steam will have no further influence upon its surfaces. The main valve $e$ will rise rapidly from its seat, and the actuator valve $f$ will become rapidly seated, the part of the spindle $g'$ above the actuator valve pushing against the projecting internal spindle $g'$.

The fall to its original position of the actuator valve $f$ will be determined mainly by the relation of the pressure of steam in the passage $c$ to the additionally compressed spring $m'$, and this relation is determined and variable through the internal spindle $g'$, which will enable the distance between main valve $e$ and the actuator valve $f$ to be axially variable so that the latter can be seated with more or less compression of the spring $m'$.

Directly the pressure in the passage $c$ which will inevitably be different from that in the passage $d$, falls to the extent that the actuator valve $f$ on which it is acting is no longer able to resist the reaction of the spring $m'$ the valve will reverse. Thus directly the pressure for which the main valve $e$ is set is reached, the function of the opposing main valve $e$, and actuator valve $f$ will be changed, and the actuator valve $f$ will become closed against pressure while the upper is open. The fluid which enters the openings $d$ will escape through the open main valve $e$ and opening $b$; and this will continue until the pressure holding the actuator valve $f$ to its seat is overcome by the spring. When this occurs the return motion will be rapid. If then the area of the lower seat is calculated correctly the valve can be made to reverse its functions at the pressure required and if necessary at the nearest fractional difference from the original "popping pressure" by adjusting the spindle $g'$ through the threaded portion $r$.

By this combination it is possible to make a valve which will be extremely sensitive at high pressures, and at the same time keep the loading arrangement very light and within a very small compass.

The main valve being free from external lips of "huddling" chambers, that is to say a secondary compartment formed outside the valve by a lip, and by a curl on the seat which makes the pressure of the escaping steam act on a greater area, will return freely to its seat without being destroyed by high pressure fluids and may be stream lined for this purpose.

An advantage of this valve is that it can be set to rise to a full bore opening which will be maintained fully until the moment at which the valve is set to close when it will reverse and close as speedily as it went up.

The principle is that of transferring the operative function of working against the same loading device from one valve to another, which makes it possible to vary the closing pressures from the lifting pressures irrespective of the original load.

What I claim and desire to secure by Letters Patent is:—

1. An automatically operated fluid valve comprising a main valve and a supplementary actuator valve on the side of the main valve presented to the actuating fluid pressure, both controlled by a common loading device, means being provided whereby the lift of the actuator valve can be varied and adjusted independently of the lift of the main valve.

2. An automatically operated fluid valve comprising a main valve and a supplementary actuator valve on the side of the main valve presented to the actuating fluid pressure, both controlled by a common loading device, the effective areas of the valve and the valve-like actuator being different, means being provided whereby the load operating against the actuator valve can be varied and adjusted independently of the load operating against the main valve.

3. An automatically operated fluid valve comprising a main valve and a supplementary actuator valve on the side of the main valve presented to the actuating fluid pressure, both controlled by a common loading device, means being provided whereby the load operating against the actuator valve can be varied and adjusted independently of the load operating against the main valve, the main valve and actuator valve being provided with separate spindles.

4. An automatically operated fluid valve comprising a main valve and a supplementary actuator valve on the side of the main valve presented to the actuating fluid pressure, both controlled by a common loading device, means being provided whereby the load operating against the actuator valve can be varied and adjusted independently of the load operating against the main valve, a fluid conduit for the actuator valve, and a conduit for the escaping fluid, the fluid conduit to the actuator valve being separated from the conduit for the fluid escaping through the main valve.

5. An automatically operated fluid valve comprising a main valve and a supplementary actuator valve on the side of the main valve presented to the actuating fluid pressure, both controlled by a common loading device, means being provided whereby the load operating against the actuator valve can be varied and adjusted independently of the load operating against the main valve, the actuator valve operating within a conduit designed to maintain the full pressure on one side of the actuator valve, the opposite side thereof being provided with a nozzle which in use is surrounded by the escaping fluid in such a way as to use the velocity of this escaping fluid to increase the difference in pressure operating the actuator valve.

6. An automatically operated fluid valve comprising a main valve and a supplementary actuator valve on the side of the main valve presented to the actuating fluid pressure, both controlled by a common loading device, means being provided whereby the load operating against the actuator valve can be varied and adjusted independently of the load operating against the main valve, the main valve and actuator being provided with separate spindles, the actuator valve operating within a conduit designed to maintain the full pressure on one side of the actuator valve, the opposite side thereof being provided with a nozzle which in use is surrounded by the escaping fluid in such a way as to use the velocity of this escaping fluid to increase the difference in pressure operating the actuator valve.

In testimony whereof, I affix my signature.

HAROLD LYALL MASON.